US012791352B2

(12) United States Patent
Lukarski et al.

(10) Patent No.: US 12,791,352 B2

(45) Date of Patent: Nov. 10, 2026

(54) SYNTHESIZING COMPLEMENTARY PROBE DATA USING IMAGING DATA

(71) Applicant: Woven by Toyota, Inc., Tokyo (JP)

(72) Inventors: Dimitar H Lukarski, Sunnyvale, CA (US); Ryan M Wiesenberg, South Lyon, MI (US)

(73) Assignee: WOVEN BY TOYOTA, INC., Tokyo (JP)

( * ) Notice: Subject to any disclaimer, the term of this patent is extended or adjusted under 35 U.S.C. 154(b) by 328 days.

(21) Appl. No.: 18/330,803

(22) Filed: Jun. 7, 2023

(65) Prior Publication Data

US 2024/0377221 A1 Nov. 14, 2024

Related U.S. Application Data

(63) Continuation-in-part of application No. 18/195,696, filed on May 10, 2023.

(51) Int. Cl.

| | |
|---|---|
| ***G01C 21/00*** | (2006.01) |
| ***G01S 13/86*** | (2006.01) |
| ***G01S 13/89*** | (2006.01) |
| ***G01S 17/89*** | (2020.01) |

(52) U.S. Cl.

CPC ........ *G01C 21/3841* (2020.08); *G01S 13/865* (2013.01); *G01S 13/89* (2013.01); *G01S 17/89* (2013.01)

(58) Field of Classification Search

CPC ........................... G01C 21/3841; G01C 21/30; G01C 21/3822; G01C 21/3852; G01S 13/865; G01S 13/89; G01S 17/89; G06T 2210/61

USPC .......................................................... 701/451

See application file for complete search history.

(56) References Cited

U.S. PATENT DOCUMENTS

| | | | | |
|---|---|---|---|---|
| 6,470,265 | B1 * | 10/2002 | Tanaka | G01C 21/3852 701/532 |
| 8,121,350 | B2 | 2/2012 | Klefenz | |
| 9,064,341 | B2 | 6/2015 | Hultquist et al. | |
| 9,291,463 | B2 | 3/2016 | Kenyon | |
| 10,001,378 | B2 | 6/2018 | Mund | |
| 10,223,816 | B2 | 3/2019 | Dorum et al. | |

(Continued)

FOREIGN PATENT DOCUMENTS

| | | | |
|---|---|---|---|
| EP | 2462411 | B1 | 7/2015 |
| EP | 3832260 | A1 | 6/2021 |

(Continued)

*Primary Examiner* — Fadey S. Jabr
*Assistant Examiner* — Paula L Schneider
(74) *Attorney, Agent, or Firm* — Christopher G. Darrow; Darrow Mustafa PC

(57) ABSTRACT

Systems, methods, and other embodiments described herein relate to improving the generation multiple vehicle traces for a roadway. In one embodiment, a method includes acquiring sensor data about a roadway, including at least imaging data of an overhead view of the roadway. The method includes generating complementary traces of the roadway using a trace model that iteratively generates the complementary traces according to learned perturbations that imitate information acquired from probe vehicles traversing the roadway, including variations between separate traversals. The method includes providing the complementary traces that include multiple vehicle traces and associated detections about attributes of the roadway.

20 Claims, 7 Drawing Sheets

(56) References Cited

U.S. PATENT DOCUMENTS

| | | | | |
|---|---|---|---|---|
| 11,487,288 | B2 | 11/2022 | Iandola et al. | |
| 2004/0218910 | A1 | 11/2004 | Chang et al. | |
| 2013/0063435 | A1 | 3/2013 | Stannard et al. | |
| 2018/0349526 | A1* | 12/2018 | Atsmon | G06N 3/045 |
| 2019/0271550 | A1 | 9/2019 | Breed et al. | |
| 2019/0325264 | A1 | 10/2019 | Keserich et al. | |
| 2020/0033866 | A1 | 1/2020 | Song et al. | |
| 2020/0193157 | A1* | 6/2020 | Soni | G06F 18/2163 |
| 2020/0302250 | A1* | 9/2020 | Chu | G06F 30/13 |
| 2020/0386569 | A1 | 12/2020 | Stajner et al. | |
| 2020/0401136 | A1 | 12/2020 | Iandola et al. | |
| 2021/0012165 | A1* | 1/2021 | Jiang | G01S 13/867 |
| 2021/0049412 | A1 | 2/2021 | Keserich et al. | |
| 2021/0150893 | A1* | 5/2021 | Mubarek | G01C 21/3844 |
| 2021/0270360 | A1 | 9/2021 | Aota et al. | |
| 2022/0237522 | A1* | 7/2022 | Kalcher | G06N 3/045 |
| 2022/0309696 | A1* | 9/2022 | Wang | G06N 3/09 |
| 2023/0195122 | A1 | 6/2023 | Shenfeld et al. | |
| 2024/0185524 | A1 | 6/2024 | McCormack | |
| 2024/0344846 | A1* | 10/2024 | Huffman | G01C 21/3804 |

FOREIGN PATENT DOCUMENTS

| | | | |
|---|---|---|---|
| WO | 2022035373 | A1 | 2/2022 |
| WO | 2022170815 | A1 | 8/2022 |
| WO | 2022258142 | A1 | 12/2022 |

* cited by examiner

SYNTHESIZING COMPLEMENTARY PROBE DATA USING IMAGING DATA

CROSS-REFERENCE TO RELATED APPLICATIONS

This application is a continuation-in-part and claims benefit of U.S. application Ser. No. 18/195,696, filed on, May 10, 2023, which is herein incorporated by reference in its entirety.

TECHNICAL FIELD

The subject matter described herein relates, in general, to synthesizing probe data and, more particularly, to generating multiple complementary traces by applying a generative model that perturbs the traces to imitate probe data collected from vehicles.

BACKGROUND

Vehicles may be equipped with sensors that facilitate perceiving aspects of a surrounding environment. For example, a vehicle may be equipped with one or more cameras, location sensors, and so on to provide information about the vehicle and the surrounding environment. This sensor data can be useful in various circumstances for deriving trace data that provide for mapping roadways at a level of the lane according to inferences about the path traveled by the vehicle. That is, trace data can include a path of the vehicle along a roadway depicted by periodic identifications of a location (e.g., GPS location). However, because generating a map in this way requires the acquisition of trace data for all roadways in a network and may further use not just a single pass but multiple passes through a region, acquiring sufficient information to successfully generate a map may be difficult. That is, in some regions, probe vehicles may be sparse or may not be permitted to collect information due to local laws. Accordingly, using probe data for these areas may not be feasible, thereby frustrating the use of existing pipelines that rely on probe data to generate maps.

SUMMARY

In one embodiment, example systems and methods relate to a manner of improving the synthesis of complementary traces for a roadway using at least imaging data. As previously noted, probe data may not be available because of limitations on access and/or local laws prohibiting the collection of such data. As such, mapping pipelines that rely on probe data to generate lane-level maps may not function for such locations. Moreover, the mapping pipelines generally do not map a roadway using a single vehicle trace. Instead, a mapping pipeline using multiple vehicle traces and associated detections for a section of roadway. Thus, where probe data is unavailable or is only sparse, the mapping pipeline may not be able to generate a map.

Therefore, in at least one approach, an inventive system synthesizes complementary traces from imaging data that is generally comprised of overhead images, such as satellite images, and may further use sparse probe data when available. For example, the inventive system may implement one or more models, such as a trace model that is a generative neural network. The trace model is able to intake the imaging data and generate complementary traces according to learned perturbations. That is, when a vehicle collects probe data, characteristics of the surrounding environment influence how the sensors perceive the environment and the characteristics then subsequently influence analysis of the sensor data when producing probe data. Accordingly, the trace model learns the perturbations and integrates the perturbations into the traces during generation. The system then iterates to generate multiple traces for a roadway that vary across the roadway (e.g., across and within lanes) to imitate actual probe data from multiple passes of vehicles along the roadway.

Thus, the complementary traces encompass multiple separate traces over the roadway that include traces, which are locations of a simulated probe vehicle as the vehicle traverse the roadway and detections. A trace defines a path of the vehicle through the environment according to periodic detections of a location of the vehicle according to a GPS location. The detections are perceptions derived from sensor data acquired by the vehicle and can include road boundaries, lane boundaries, and so on. Thus, the trace model functions to generate the complementary traces with variations therebetween in order to mimic real data.

The inventive system can then use the complementary traces along with a mapping pipeline to generate a lane-level map of the roadway, which may then be employed by a vehicle to traverse the roadway using automated systems. In this way, the noted approach improves generating maps where probe data is otherwise unavailable.

In one embodiment, a mapping system for synthesizing probe vehicle trace data is disclosed. The mapping system includes one or more processors and a memory communicably coupled to the one or more processors. The memory stores instructions that, when executed by the one or more processors, cause the one or more processors to acquire sensor data about a roadway, including at least imaging data of an overhead view of the roadway. The instructions include instructions to generate complementary traces of the roadway using a trace model that iteratively generates the complementary traces according to learned perturbations that imitate information acquired from probe vehicles traversing the roadway, including variations between separate traversals. The instructions include instructions to provide the complementary traces that include multiple vehicle traces and associated detections about attributes of the roadway.

In one embodiment, a non-transitory computer-readable medium including instructions that, when executed by one or more processors, cause the one or more processors to perform one or more functions is disclosed. The instructions include instructions to acquire sensor data about a roadway, including at least imaging data of an overhead view of the roadway. The instructions include instructions to generate complementary traces of the roadway using a trace model that iteratively generates the complementary traces according to learned perturbations that imitate information acquired from probe vehicles traversing the roadway, including variations between separate traversals. The instructions include instructions to provide the complementary traces that include multiple vehicle traces and associated detections about attributes of the roadway.

In one embodiment, a method is disclosed. In one embodiment, the method includes acquiring sensor data about a roadway, including at least imaging data of an overhead view of the roadway. The method includes generating complementary traces of the roadway using a trace model that iteratively generates the complementary traces according to learned perturbations that imitate information acquired from probe vehicles traversing the roadway, including variations between separate traversals. The method includes providing the complementary traces that include multiple vehicle traces and associated detections about attributes of the roadway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the synthesis of complementary traces for a roadway using at least imaging data are disclosed. As previously noted, probe data may not be available because of limitations on access and/or local laws prohibiting the collection of such data. Moreover, mapping pipelines generally do not map a roadway using a single vehicle trace. Thus, where probe data is unavailable or is only sparse, the mapping pipeline may not be able to generate a map.

Therefore, in at least one approach, a mapping system synthesizes complementary traces from imaging data that is generally comprised of overhead images, such as satellite images, and may further use sparse probe data when available and/or other previously generated traces. For example, the inventive system may implement one or more models, such as a trace model that is a generative neural network. The trace model intakes the imaging data and generates complementary traces according to learned perturbations. That is, when a vehicle collects probe data, characteristics of the surrounding environment influence how the sensors perceive the environment and the characteristics then subsequently influence analysis of the sensor data when producing probe data. Accordingly, the trace model learns the perturbations and integrates the perturbations into the traces during generation. The system then iterates to generate multiple traces for a roadway that vary across the roadway (e.g., across and within lanes) to imitate actual probe data from multiple passes of vehicles along the roadway.

Thus, the complementary traces encompass multiple separate traces over the roadway that include traces, which are locations of a simulated probe vehicle as the vehicle traverses the roadway and detections produced from observations. A trace defines a path of the vehicle through the environment according to periodic detections of a location of the vehicle according to a GPS location. The detections are perceptions derived from sensor data acquired by the vehicle and can include road boundaries, lane boundaries, and so on. Thus, the trace model functions to generate the complementary traces with variations therebetween in order to mimic real data.

The mapping system can then use the complementary traces along with a mapping pipeline to generate a lane-level map of the roadway, which may then be employed by a vehicle to traverse the roadway using automated systems. In this way, the noted approach improves generating maps where probe data is otherwise unavailable.

Figure 1:
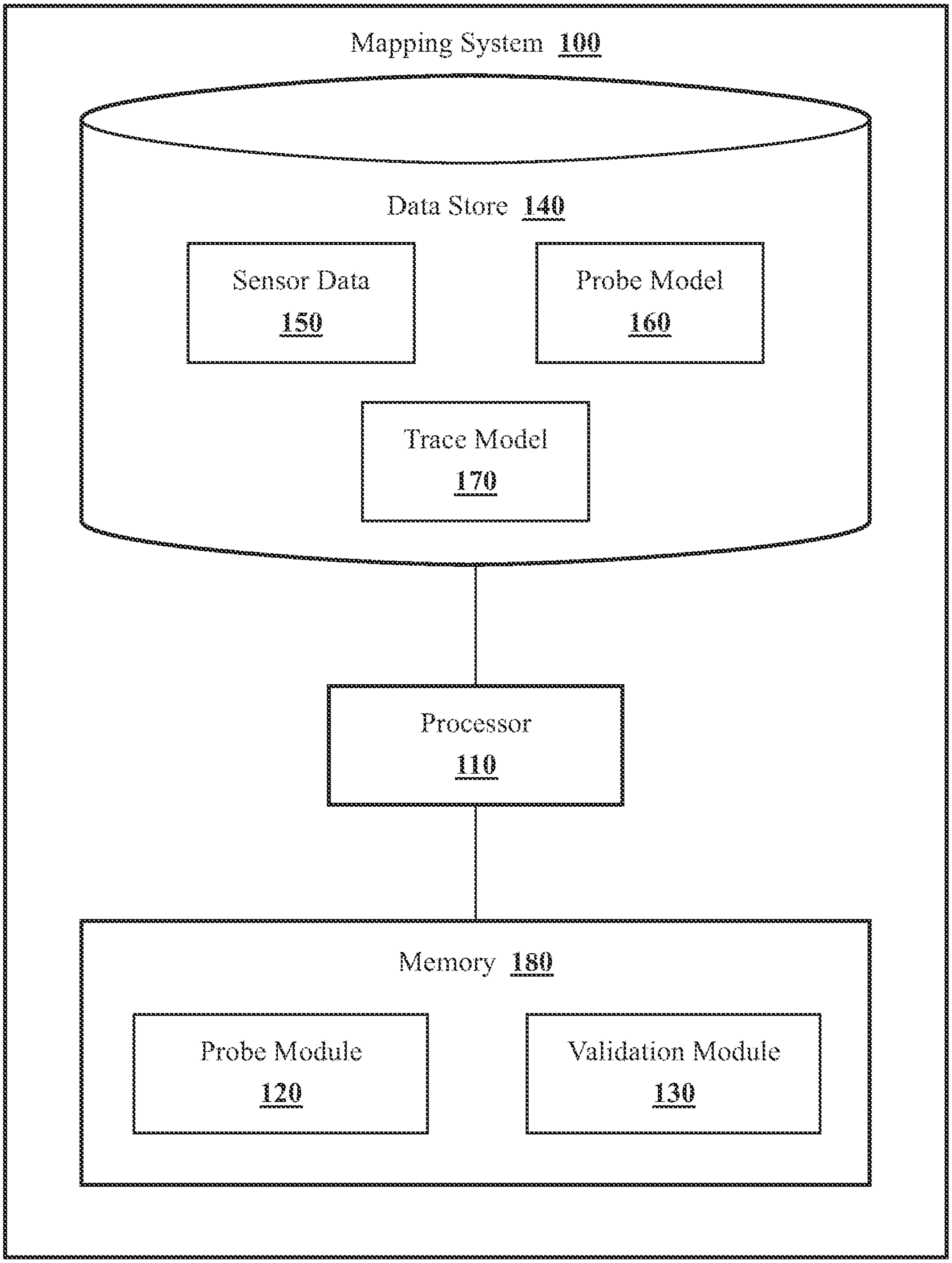
FIG. 1 illustrates one embodiment of a mapping system that is associated with using imaging data to synthesize complementary traces.

With reference to FIG. 1, one embodiment of a mapping system 100 is further illustrated. The mapping system 100 is shown as including a processor 110, which may be from a vehicle 700 of FIG. 7 or may be associated with a separate computing device, such as a server, cloud-computing system, and so on. Accordingly, the processor 110 may be a part of the mapping system 100, the mapping system 100 may include a separate processor from the processor 710 of the vehicle 700, or the mapping system 100 may access the processor 110 through a data bus or another communication path. In one embodiment, the mapping system 100 includes a memory 180 that stores a probe module 120 and a validation module 130. The memory 180 is a random-access memory (RAM), read-only memory (ROM), a hard-disk drive, a flash memory, or another suitable memory for storing the modules 120 and 130. The modules 120 and 130 are, for example, computer-readable instructions that, when executed by the processor 110, cause the processor 110 to perform the various functions disclosed herein. In alternative arrangements, the modules 120 and 130 are independent elements from the memory 180 that are, for example, comprised of hardware elements (e.g., arrangements of logic gates). Thus, the modules 120 and 130 are alternatively ASICs, hardware-based controllers, a composition of logic gates, or another hardware-based solution.

Figure 2:
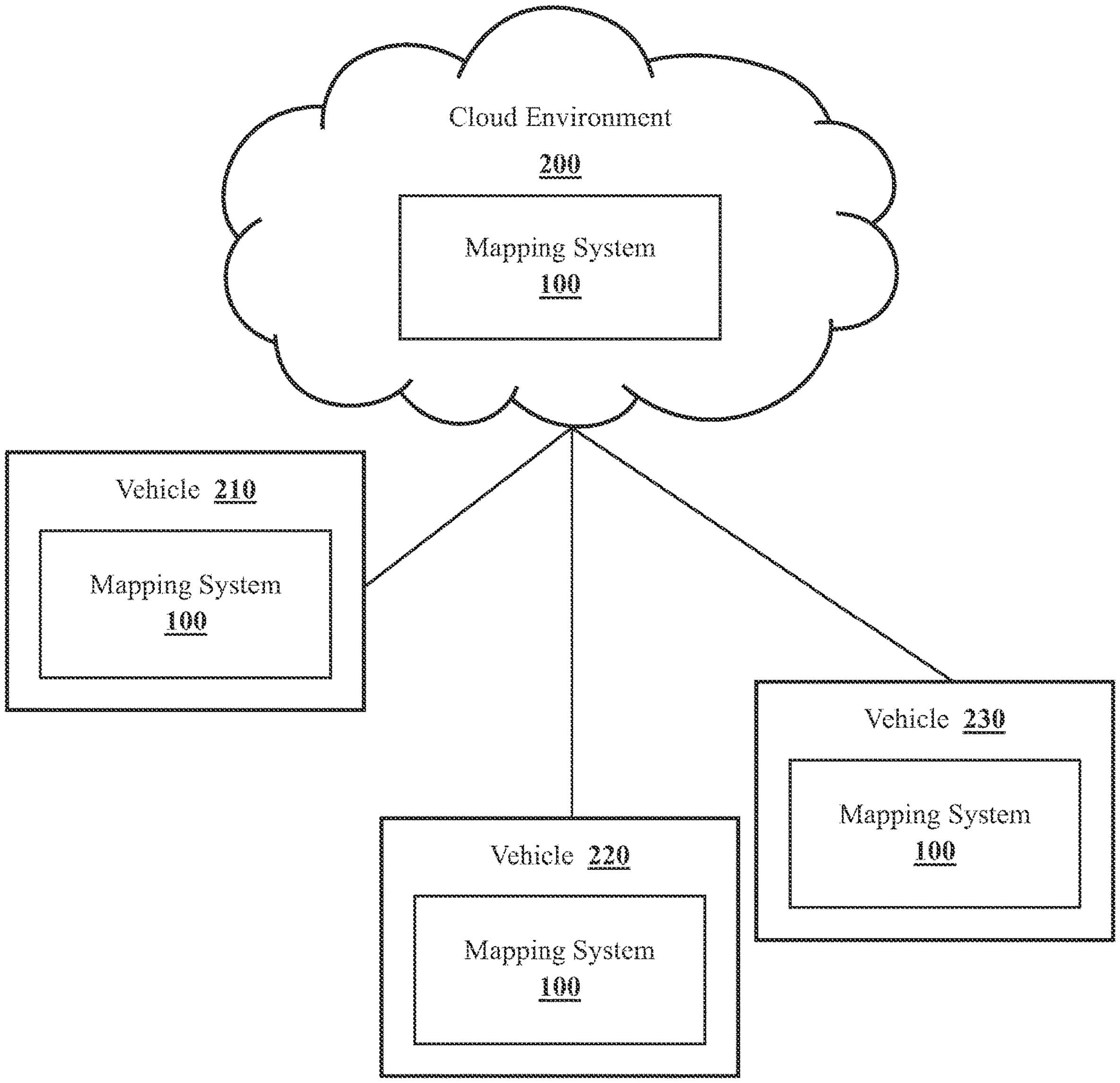
FIG. 2 illustrates one embodiment of the mapping system of FIG. 2 in a cloud-computing environment.

The mapping system 100, as illustrated in FIG. 1, is generally an abstracted form of the mapping system 100 as may be implemented between the vehicle 700 and a cloud-computing environment 200. FIG. 2 illustrates one example of a cloud-computing environment 200 that may be implemented along with the mapping system 100. As illustrated in FIG. 2, the mapping system 100 is embodied at least in part within the cloud-computing environment 200.

In one or more approaches, the cloud environment 200 may facilitate communications between multiple different vehicles to acquire and distribute information between vehicles 210, 220, and 230. Accordingly, as shown, the mapping system 100 may include separate instances within one or more entities of the cloud-based environment 200, such as servers, and also instances within vehicles that function cooperatively to acquire, analyze, and distribute the noted information. In a further aspect, the entities that implement the mapping system 100 within the cloud-based environment 200 may vary beyond transportation-related devices and encompass mobile devices (e.g., smartphones), and other devices that may benefit from the functionality and/or generated maps discussed herein. Thus, the set of entities that function in coordination with the cloud environment 200 may be varied.

In one approach, functionality associated with at least one module of the mapping system 100 is implemented within the vehicle 700, while further functionality is implemented within a cloud-based computing system. Thus, the mapping system 100 may include a local instance at the vehicle 700 and a remote instance that functions within the cloud-based environment.

Moreover, the mapping system 100, as provided for herein, may function in cooperation with a communication system. In one embodiment, the communication system communicates according to one or more communication standards. For example, the communication system can include multiple different antennas/transceivers and/or other hardware elements for communicating at different frequencies and according to respective protocols. The communication system, in one arrangement, communicates via a communication protocol, such as a WiFi, DSRC, V2I, V2V, or another suitable protocol for communicating between the vehicle and other entities in the cloud environment. Moreover, the communication system, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the mapping system 100 can leverage various wireless communication technologies to provide communications to other entities, such as members of the cloud-computing environment.

With continued reference to FIG. 1, in one embodiment, the mapping system 100 includes the data store 140. The data store 140 is, in one embodiment, an electronic data structure stored in the memory 180 or another data storage device that is configured with routines that can be executed by the processor 110 for analyzing stored data, providing stored data, organizing stored data, and so on. Thus, in one embodiment, the data store 140 stores data used by the modules 120 and 130 in executing various functions. In one embodiment, the data store 140 stores the sensor data 150, the probe model 160, and the trace model 170.

The probe module 120 generally includes instructions that function to control the processor 110 to acquire data inputs that form the sensor data 150. In various arrangements, the sensor data 150 may be acquired from separate remote devices, such as satellites, aerial imaging platforms, and so on. For example, the probe module 120 may communicate directly with the collection mechanisms or through a service that acquires the imaging data and then routes the imaging data to the probe module 120, which is stored as the sensor data 150. In further aspects, the probe module 120 may acquire additional data as part of the sensor data 150 and thus may communicate with multiple different sources.

For example, the sensor data 150 can also include, in various arrangements, observations of one or more objects in an environment proximate to the vehicle 700 and/or other aspects about the surroundings. That is, when available, the sensor data 150 can include actual observations that are, for example, incomplete about roadway for which the mapping system 100 is generating complementary traces. As provided for herein, the probe module 120, in one embodiment, acquires sensor data 150 that includes vehicle location, camera images, and so on. In further arrangements, the probe module 120 acquires the sensor data 150 from further sensors such as a radar 723, a LiDAR 724, and other sensors as may be suitable for identifying aspects of the roadway and surrounding environment. Moreover, while raw sensor information is described, the probe module 120 may further acquire processed data that forms derived observations of the surrounding environment, such as detections of lane markers, road boundaries, signs, traffic signals, and so on. For example, consider that a vehicle may acquire incomplete observations of a roadway that include trace data (i.e., locations of traversed positions) but do not include detections or traces that are sparse with missing intervening positions. In general, the information that is used that is from direct observations of the roadway, as described herein, is incomplete in that the information is insufficient to generate a lane-level map using the mapping pipeline.

Accordingly, the probe module 120, in one embodiment, controls the respective sensors to provide the data inputs in the form of the sensor data 150 or at least receives the sensor data via one or more intermediaries therefrom. Moreover, the probe module 120 can undertake various approaches to fuse data from multiple sensors when providing the sensor data 150 and/or from sensor data acquired over a wireless communication link (e.g., v2v) from one or more of the surrounding vehicles. Thus, the sensor data 150, in one embodiment, represents a combination of perceptions acquired from multiple sensors and/or entities.

In general, the sensor data 150 includes at least the imaging data. The imaging data includes overhead images of a roadway that may span a defined region, such as a defined distance, a geopolitical area (e.g., a township, county, state, etc.), an area defined according to a format of the data itself, etc. The imaging data generally provides sufficient resolution to resolve features of the roadway, including lane markers. Thus, the imaging data may have a resolution of at least 20 cm. In further aspects, the imaging data includes, additionally or alternatively, radar imaging, LiDAR imaging, or another source of imaging data that provides information about the roadway without using a vehicle to explicitly drive through the region.

When available, the sensor data 150 may further include probe data, which is, for example, comprised of information from a vehicle, as outlined previously. As an additional clarification, the present disclosure uses the terms trace data and probe data. It should be appreciated that probe data includes trace data (i.e., locations traversed by a vehicle) and detection (i.e., observations of a surrounding environment of a vehicle). In any case, while the primary source of information is the imaging data, the mapping system 100 can also utilize probe data. It should be noted that the probe data is generally not available, but when it is, this data is sparse. That is, the probe data used by the mapping system 100 may be sporadic (e.g., provided in disconnected intervals).

The probe data may include a vehicle trace and detections from the vehicle when synthesized and when collected directly. The vehicle trace is a series of locations of the vehicle as the vehicle traverses the roadway. Thus, the vehicle trace may be represented as a series of points representing the locations connected by line segments. Additionally, the separate points, which are also referred to as frames, may be associated with detections. The detections include information derived from acquired data about the surroundings by the vehicle, such as lane markings, road boundaries, traffic signals, road paint (e.g., crosswalks, lane arrows, etc.), and so on. As such, the sensor data 150 can include a varied set of information depending on availability.

The probe module 120, in one embodiment, includes instructions that cause the processor 110 to initially acquire the sensor data 150 and then, in at least one approach, process the sensor data 150 using the probe model 160 and/or the trace model 170. The probe model 160 and the trace model 170 are, in at least one arrangement, generative neural networks having an encoder-decoder structure, as discussed further subsequently. In any case, the models 160/170 are generally integrated with the probe module 120 and function to process the sensor data 150 into synthetic probe data, which can include single iterations and complementary traces of probe data that are perturbed. That is, for example, the probe model 160 intakes satellite images of a roadway and produces probe data that predicts what a vehicle would generate if the vehicle traversed the roadway depicted by the satellite image. Furthermore, the trace model 170 intakes the sensor data 150, which may further include probe data generated by the probe model 160 and generates a set of complementary traces that are varied across the roadway to mimic a plurality of vehicles traversing the roadway. In this way, the mapping system 100 is able to provide probe data for a region in which probe data is otherwise unavailable and thereby facilitate the use of existing mapping pipelines to generate lane-level map data for the region.

Figure 3:
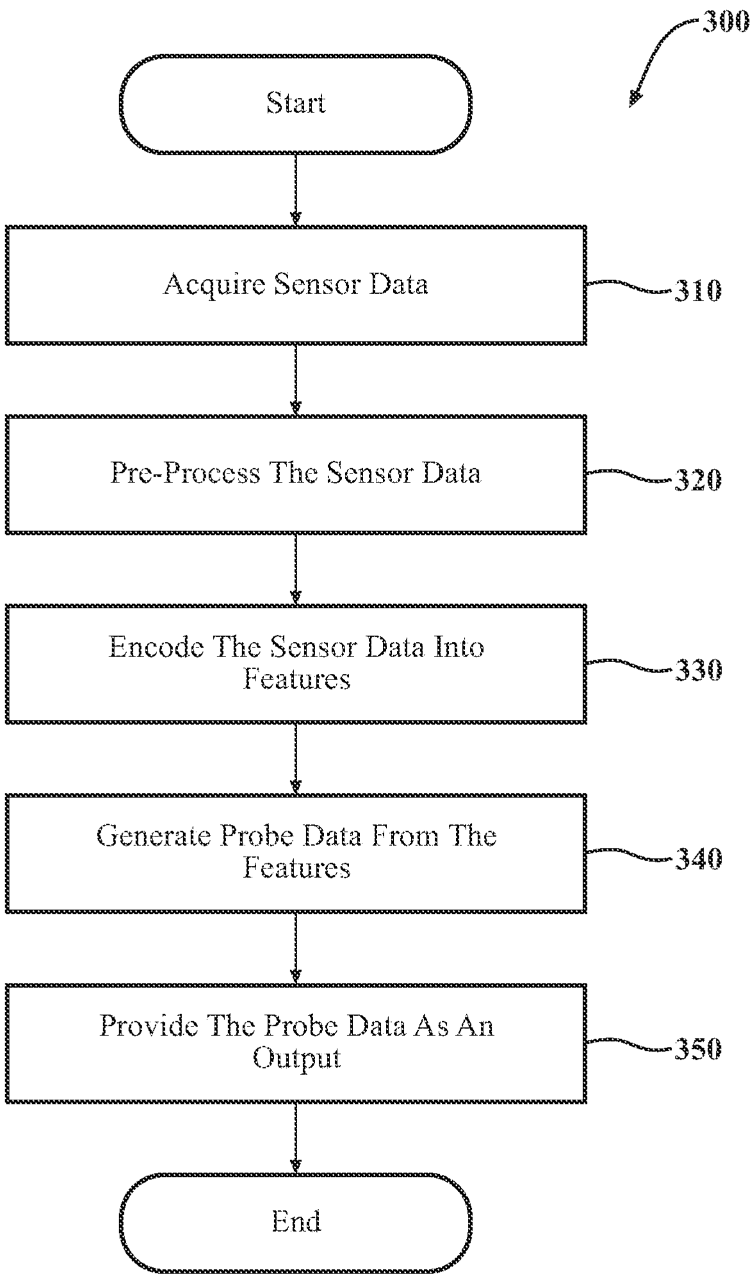
FIG. 3 illustrates a flowchart for one embodiment of a method that is associated with synthesizing probe data using a generative neural network.

Additional aspects of synthesizing single probe data will be discussed in relation to FIG. 3. FIG. 3 illustrates a flowchart of a method 300 that is associated with using a generative model to synthesize probe data from images. Method 300 will be discussed from the perspective of the mapping system 100 of FIGS. 1 and 2. While method 300 is discussed in combination with the mapping system 100, it should be appreciated that the method 300 is not limited to being implemented within the mapping system 100 but is instead one example of a system that may implement the method 300. Moreover, the method 300 focuses on the generation of a single trace and detections, whereas method 400 is associated with generating complementary traces.

At 310, the probe module 120 acquires sensor data about a roadway. In one example, the sensor data is embodied as imaging data that may be acquired from a remote source, such as a satellite, an aerial vehicle (e.g., a plane or drone), or from a service that compiles such data from various sources. As mentioned previously, in addition to imaging data, the sensor data 150, in one or more arrangements, can include sparse probe data or, for instances of performing validation, one or more sets of probe data for a region. For purposes of brevity, the discussion of particular aspects of the probe data will not be repeated. In any case, it should be appreciated that the presence of actual probe data is not required in order to produce synthetic probe data using the probe model 160.

At 320, the probe module 120 pre-processes the sensor data 150. Depending on which data is provided and a form of the sensor data 150, the pre-processing may take different forms. For example, when the sensor data 150 is of an acceptable format and is known to be valid, the probe module 120 may skip the pre-processing. However, in other circumstances, the probe module 120 pre-processes the sensor data 150 by validating the data. For example, the probe module 120 determines whether the imaging data is up-to-date and is not older than a defined threshold of time (e.g., six months). In this way, the probe module 120 avoids using outdated information to generate the probe data. Moreover, the probe module 120 can perform further pre-processing functions, such as fusing sparse probe data with the imaging data. For example, the probe module 120 can embed information from the probe data into the imaging data (e.g., an overhead image) in order to provide the information into the probe model 160 in a combined format. The data may be fused using an additional channel that matches spatial relationships or by modifying the image data itself.

At 330, the probe module 120 encodes the sensor data 150 (e.g., imaging data) using the probe model 160 into features. The features are abstract representations of the attributes of the roadway as provided within the sensor data 150. In general, the probe module 120 may apply an encoder of the probe model 160 to reduce a spatial representation of the imaging data into the features. The features may be represented using a vector that maps into a latent space of the probe model 160. In one configuration, the encoder is comprised of convolutional layers and pooling layers that function to transform the sensor data 150 into the features. In any case, the features represent an encoder form of the input.

At 340, the probe module 120 generates the probe data from the features using the probe model 160. In general, the probe data is synthetic or otherwise predicted according to the information with the encoded features and is not from an actual vehicle traversing the roadway. The probe model 160 is, for example, trained to generate the probe data in order to imitate real probe data. Thus, the probe data complements or otherwise matches the imaging data for the roadway. Thus, the probe model 160 provides for the probe module 120 synthesizing the probe data from the features to imitate a vehicle trace and detections of a vehicle as though the vehicle actually traveled along the roadway. As previously described, the probe data itself is comprised of a vehicle trace and detections. The vehicle trace is comprised of discretized locations of the vehicle at defined periods along a path. Thus, the determinations of location (i.e., GPS derived location) define points at which the vehicle captures its location and are connected by line segments to form the vehicle trace matching a path of the vehicle along the roadway.

The separate points/determinations of the locations are frames that are associated with different detections that the vehicle would generate at those points about the surrounding environment. When generated at the vehicle, the detections involve processing of sensor data about the surrounding environment through various mechanisms within the vehicle (e.g., automated driving modules) that identify attributes of the environment. The identified attributes of the environment include lane lines, road edge boundaries, markings within the road (e.g., crosswalks, arrows, and other markings), traffic signals, signs, etc., which are provided with, for example, absolute geographic positions. When generated by the probe model 160, the detections include the same information but are derived from inferences of information included in the imaging data and associated with the prediction locations of the vehicle trace. In this way, the probe module 120 synthesizes the probe data as virtual data to imitate a vehicle trace and detections as though a vehicle traversed the roadway.

At 350, the probe module 120 provides the probe data. Providing the probe data may involve different functions depending on the implementation. For example, in one approach, the probe module 120 uses the probe data generated at 340 to generate a map of the roadway and subsequently control a vehicle using the map according to one or more automated functions (e.g., autonomous control, ADAS, etc.). Consider that different mapping pipelines may function using different types of data inputs. While some pipelines may use image data, other pipelines use probe data. In general, these pipelines are not situated in a manner as to switch between the types of data used as input. Thus, in locations where the particular type of data is unavailable (e.g., where probe data is unavailable), they may not be able to generate map data, thereby limiting functionality that relies on such map data. Accordingly, the probe module 120 generates the probe data so that the mapping pipeline can generate map data using the probe data as input and provide a same quality of map that includes lane-level information. In this way, the mapping system 100 improves the mapping process and downstream functions of vehicles and other entities that rely on the maps.

Figure 4:
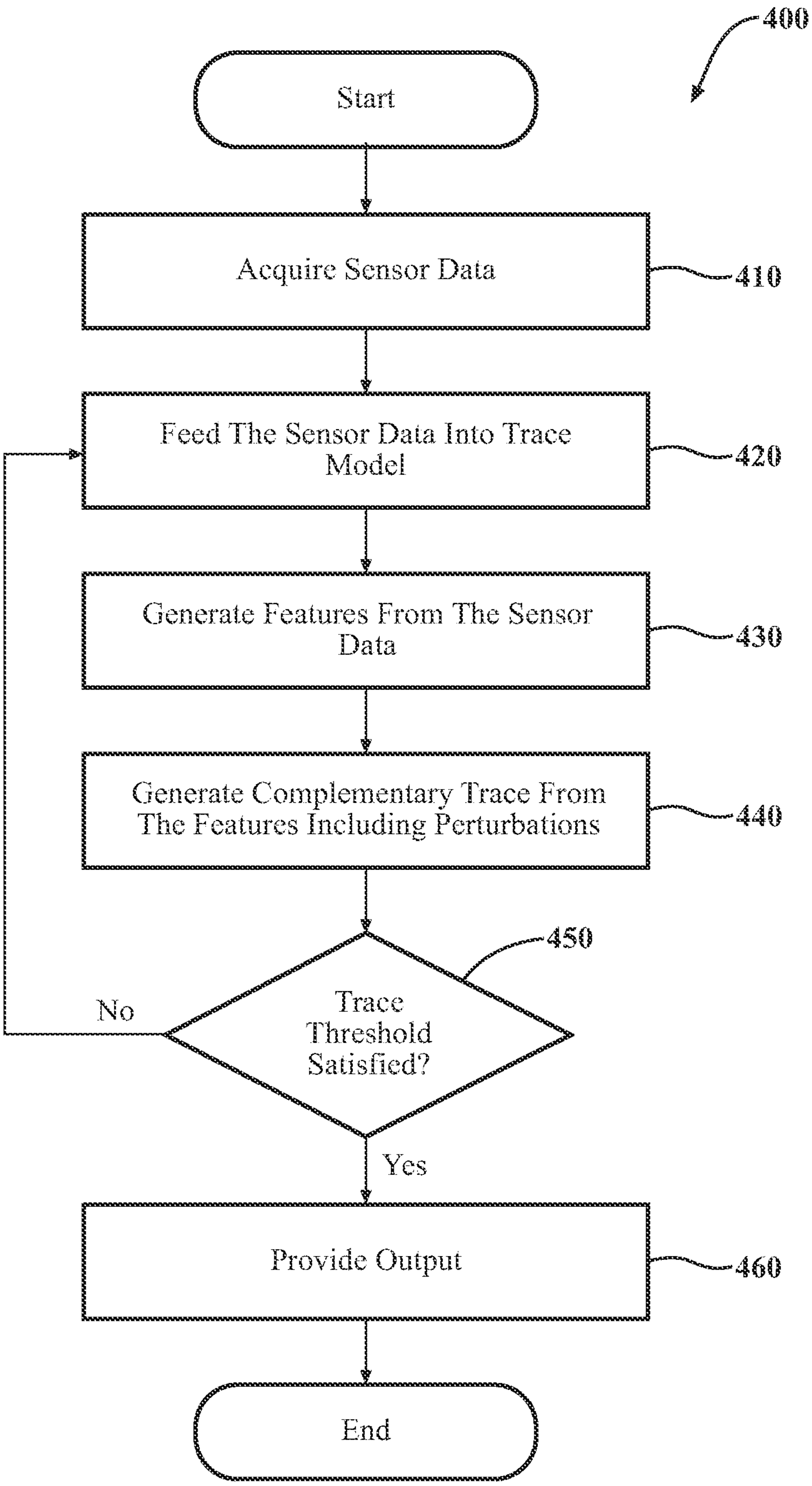
FIG. 4 illustrates a flowchart for one embodiment of a method associated with generating complementary traces.

Additional aspects of the mapping system 100 will be discussed in relation to FIG. 4. FIG. 4 illustrates a flowchart of a method 400 that is associated with generating complementary traces. Method 400 will be discussed from the perspective of the mapping system 100 of FIGS. 1, and 2. While method 400 is discussed in combination with the mapping system 100, it should be appreciated that the method 400 is not limited to being implemented within the mapping system 100 but is instead one example of a system that may implement the method 400.

At 410, the probe module 120 acquires the sensor data 150 about a roadway. As previously described, the sensor data 150 may be comprised of various pieces of information depending on, for example, availability. That is, in general, the sensor data 150 includes at least imaging data of an overhead view of the roadway. The imaging data can be from various sources, such as satellites, and so on. When available, the sensor data 150 further includes sparse probe data and/or synthetic seed probe data. For example, in one arrangement, the sensor data 150 includes partial probe data. The partial probe data (also referred to as sparse probe data) may take different forms, but is generally incomplete in that the included information is insufficient to generate a comprehensive mapping of the roadway. For example, the sparse probe data may include a single vehicle trace and detections, a vehicle trace without detections, a vehicle trace with some detections, a sporadic vehicle trace that is missing location information, and so on. Thus, the mapping system 100 may initially accept the sparse probe data and infill the sparse data to complete the data and provide at least one comprehensive trace with detections as a seed to the trace model.

In further aspects, the mapping system 100 may use the probe model 160 to synthesize an initial set of probe data that includes a vehicle trace and detections, as described in relation to method 300. However, the initial synthesized probe data is, for example, generated as a seed for subsequent steps and is not, for example, perturbed in the manner provided for by the trace model 170. In any case, the initially acquired sensor data 150 that is the basis for generating the complementary traces may take different forms depending on available information.

At 420, the probe module 120 feeds the sensor data into the trace model 170. In at least one arrangement, the probe module 120 pre-processes the sensor data 150 by fusing the imaging data and other available portions together similar to 320 of FIG. 3. As an additional note, the complementary traces are separate occurrences of probe data. Thus, the separate complementary traces are comprised of frames defining the detections and discretized locations of a vehicle trace. The detections are of the attributes that include lane boundaries, road boundaries, road markings, signs, and so on.

At 430, the probe module uses the trace model 170 to generate features from the sensor data 150 by encoding the sensor data 150. The features are abstract representations of the attributes of the roadway as represented in the sensor data 150. In general, the probe module 120 may apply an encoder of the trace model 170 to reduce a spatial representation of the sensor data 150 into the features. The features may be represented using a vector that maps into a latent space of the trace model 170. In one configuration, the encoder is comprised of convolutional layers and pooling layers that function to transform the sensor data 150 into the features. In any case, the features represent an encoded form of the input.

At 440, the probe module 120 generates a complementary trace associated with the roadway. As applied herein, the probe module 120 controls the trace model 170 to iteratively execute over the sensor data 150, as shown at blocks 420-450 of method 400. Accordingly, the probe module 120 uses the trace model 170 to generate the complementary trace according to learned perturbations that imitate information acquired from probe vehicles traversing the roadway, including variations between separate traversals. For example, the trace model 170 intakes the features generated from the encoder and applies learned perturbations to infer the complementary trace.

The learned perturbations are characteristics that vary within the probe data as collected by a probe vehicle and between different vehicles. That is, each probe vehicle has particular characteristics in the way sensors of each vehicle perceive the environment that the trace model learns for a population of vehicles such that the trace model realizes the characteristics and variations between vehicles in the generated traces as the learned perturbations. Similarly, the separate paths followed by a vehicle through an environment result in distinct characteristics within the sensor data 150 in relation to how the vehicle perceives different aspects of the roadway (e.g., lane markers, etc.) and how the actual trace varies along the roadway within and across lanes. Accordingly, the trace model 170 learns these perturbations and integrates the perturbations into the synthesized complementary traces. As such, the characteristics considered by the trace model 170 in order to assign the perturbations include contextual characteristics, such as distances to attributes of the roadway, colors of the attributes, and relative positions of the attributes in relation to a frame (i.e., location of vehicle when acquiring information). The trace model 170 considers the characteristics as encoded with the features when perturbing the features during generation of the complementary trace.

In at least one arrangement, in order to achieve a desired extent of variations between the complementary traces, the trace model 170 accepts previously generated complementary traces as part of the input with the sensor data 150. In this way, the trace model 170 is better able to mimic real-world probe data to facilitate map creation.

At 450, the probe module 120 determines whether the complementary traces satisfy the trace threshold. In one or more arrangements, the trace threshold defines a number of complementary traces that are to be generated according to the characteristics of the roadway and a defined variation of the complementary traces, where the characteristics include at least a number of lanes. For example, the threshold may define a static number of traces per lane, a number of detection points per feature (e.g., lane line, sign, etc.) in the environment, and so on. While a number of lanes is provided as one example of the characteristics that define the number of traces, other characteristics can be considered, such as location, traffic density, local climate, and so on. In general, the more lanes that are present on a roadway, the more traces the mapping system 100 generates in order to provide a comprehensive assessment of the roadway. Of course, the trace threshold may be defined differently depending on the implementation but is generally implemented to ensure that a coverage of the complementary traces is sufficient for generating a map or other uses of the traces. Accordingly, the trace threshold defines aspects of coverage of the complementary traces for a roadway. In one approach, the trace threshold defines a static number of traces per lane. In a further aspect, the trace threshold defines a density of detections for a given salient point and/or along a defined distance of the roadway. In yet a further aspect, the trace threshold is variable and may be defined according to a learned metric. The learned metric may be trained according to a process of generating maps from sets of traces including different numbers and comparing an accuracy of the generated map to a ground truth map. In this way, the learned metric can specifically learn the trace threshold for different types of roadways including both the number of complementary traces and the variances between the complementary traces.

The defined variations, in at least one approach, are defined according to a variance between positions of the traces and positions of the detections. Thus, the threshold can define minimum and/or maximum variances that correlate with expected variations as are generally observed in actual probe data. From this, the probe module 120 can assess whether the generated complementary traces mimic expected traces or do not exhibit (e.g., less or more variation) appropriate variations. That is, the probe module 120 assesses whether the distribution of the complementary traces is of an expected form.

Accordingly, when the number of traces are satisfied (e.g., met or exceeded) and the defined variation is also satisfied (e.g., when a defined range), then the probe module 120 proceeds to providing the output, as described at 460. Otherwise, the probe module 120 continues with iteratively producing additional complementary traces. Moreover, it should be appreciated that when the complementary traces are outside of a defined range for the variations, the probe module 120 may remove traces from the set that are, for example, beyond an acceptable variation. In this way, probe module 120 is able to generate many complementary traces, thereby mimicking traversals of the roadway by a myriad of probe vehicles when such data is otherwise unavailable.

At 460, the probe module 120 provides the complementary traces that include multiple vehicle traces and associated detections about attributes of the roadway. As described in relation to FIG. 3, providing the probe data in the form of the complementary traces may involve different functions depending on the implementation. For example, in one approach, the probe module 120 uses the probe data generated at 340 to generate a map of the roadway and subsequently control a vehicle using the map according to one or more automated functions (e.g., autonomous control, ADAS, etc.). In this way, the mapping system 100 improves the mapping process and downstream functions of vehicles and other entities that rely on the maps.

Figure 5:
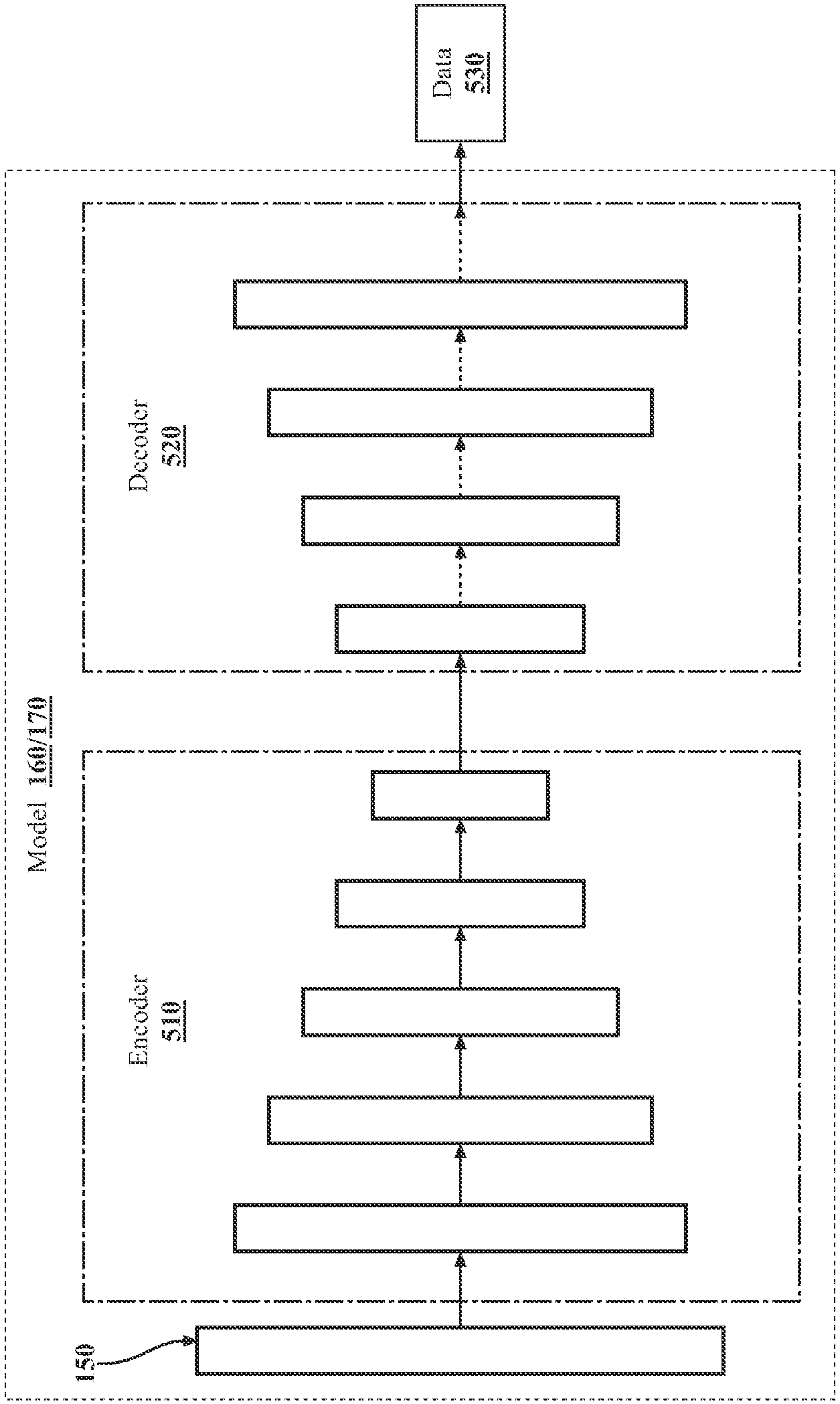
FIG. 5 illustrates one embodiment of a generative neural network.

As further detailed in FIG. 5, an architecture for the probe model 160 and trace model 170 is illustrated. It should be appreciated that the illustrated architecture can be the same/similar for both models, but the separate instances of the architecture are trained differently in order to achieve the distinct functionality. As illustrated, the architecture is an encoder/decoder architecture with an encoder 510 and a decoder 520. The configuration of the encoder 510, in one or more approaches, may include a series of layers that include, for example, convolutional layers, pooling layers, and so on. In general, the encoder 510 includes encoding layers arranged in a series that function to reduce spatial dimensions of the sensor data 150 into representations about embedded states of features included therein. The encoder 510, in at least one approach, encodes the sensor data 150 into a latent space that is represented using a feature vector with values for different aspects of the encoded information. The latent space is a spatial representation of possible features encoded by the encoder 510. By contrast, the decoder 520 is, for example, comprised of deconvolutional layers that function to predict the output according to the features provided by the encoder 510.

In further examples, the machine-learning architecture may be characterized as an autoencoder or another type of neural network that generally functions to generate an output having spatial characteristics of the probe data. Moreover, while a general form of the models 160/170 is described, the manner in which the models 160/170 are trained may vary according to the particular implementation. In at least one approach, the models 160/170 are generative adversarial networks (GAN). Thus, the models 160/170 may be complemented by discriminator networks that function to facilitate training. For example, a discriminator may accept synthetic probe data from the probe model 160 and actual probe data and attempt to determine when the input is real or synthetic. According to this determination, the probe model 160 is adapted to learn how to produce more realistic probe data. In this way, the probe model 160 learns how to generate probe data from imaging data.

Figure 6:
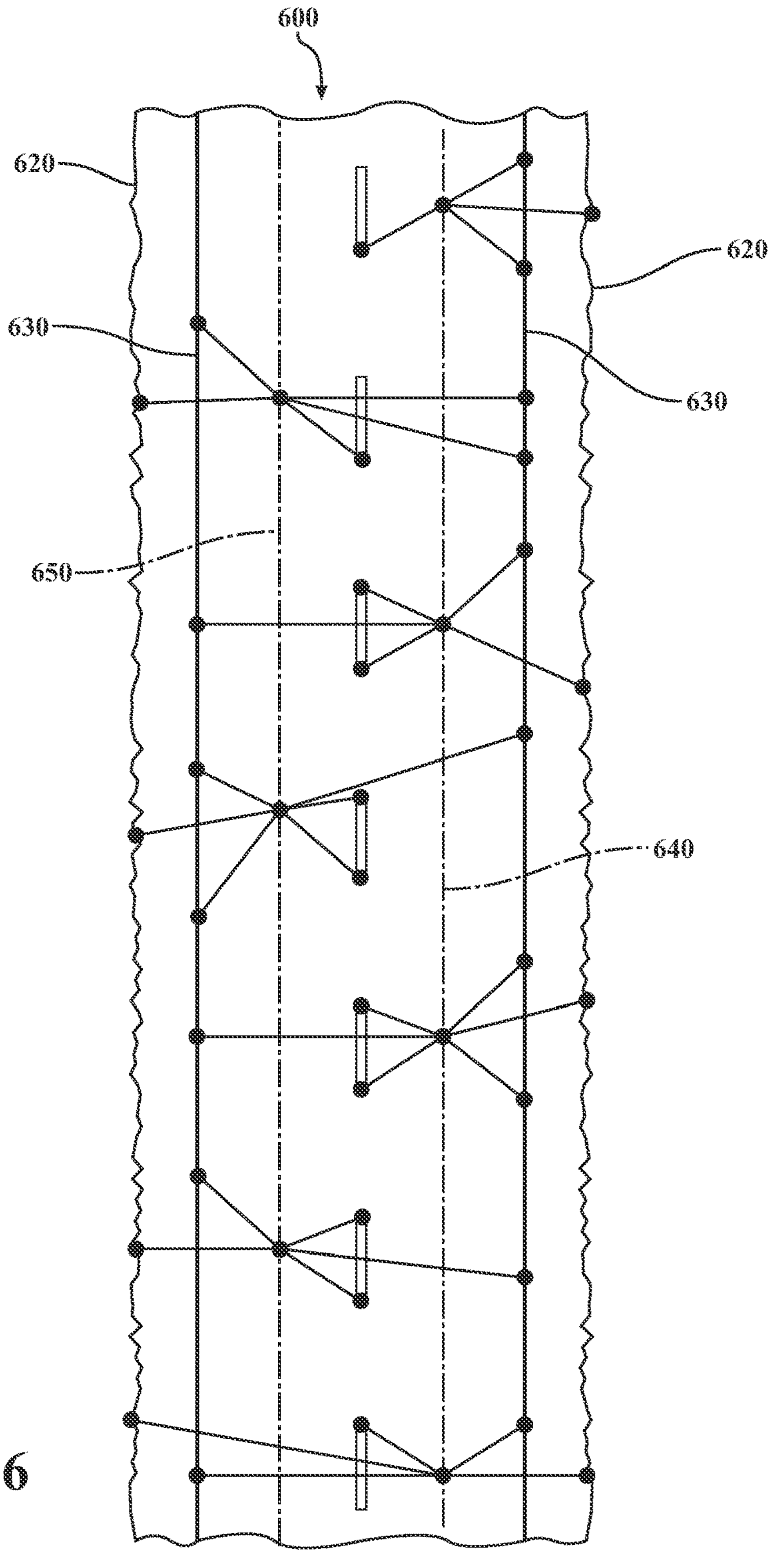
FIG. 6 illustrates an example of complementary traces and an overhead image of a roadway.

Continuing to FIG. 6, one example of overhead imagery is illustrated along with probe data in the form of two complementary traces. For example, as shown in FIG. 6, an image includes a roadway 600. The roadway includes various attributes, such as a dashed centerline 610, road edge boundaries 620, and outside lane lines 630. A vehicle trace 640 is also illustrated that is comprised of a series of points defining determinations from the vehicle about a current location at different times. The points (also referred to as frames) are further associated with detections at the separate times of the attributes noted above. An additional complementary trace 650 is also illustrated in an adjacent lane. As can be seen from the associated detections, each complementary trace varies in the locations of detections and variations within image space. Accordingly, as previously outlined, the mapping system 100 intakes the imaging data and outputs the illustrated complementary traces 640/650, including the vehicle traces and the detections.

Figure 7:
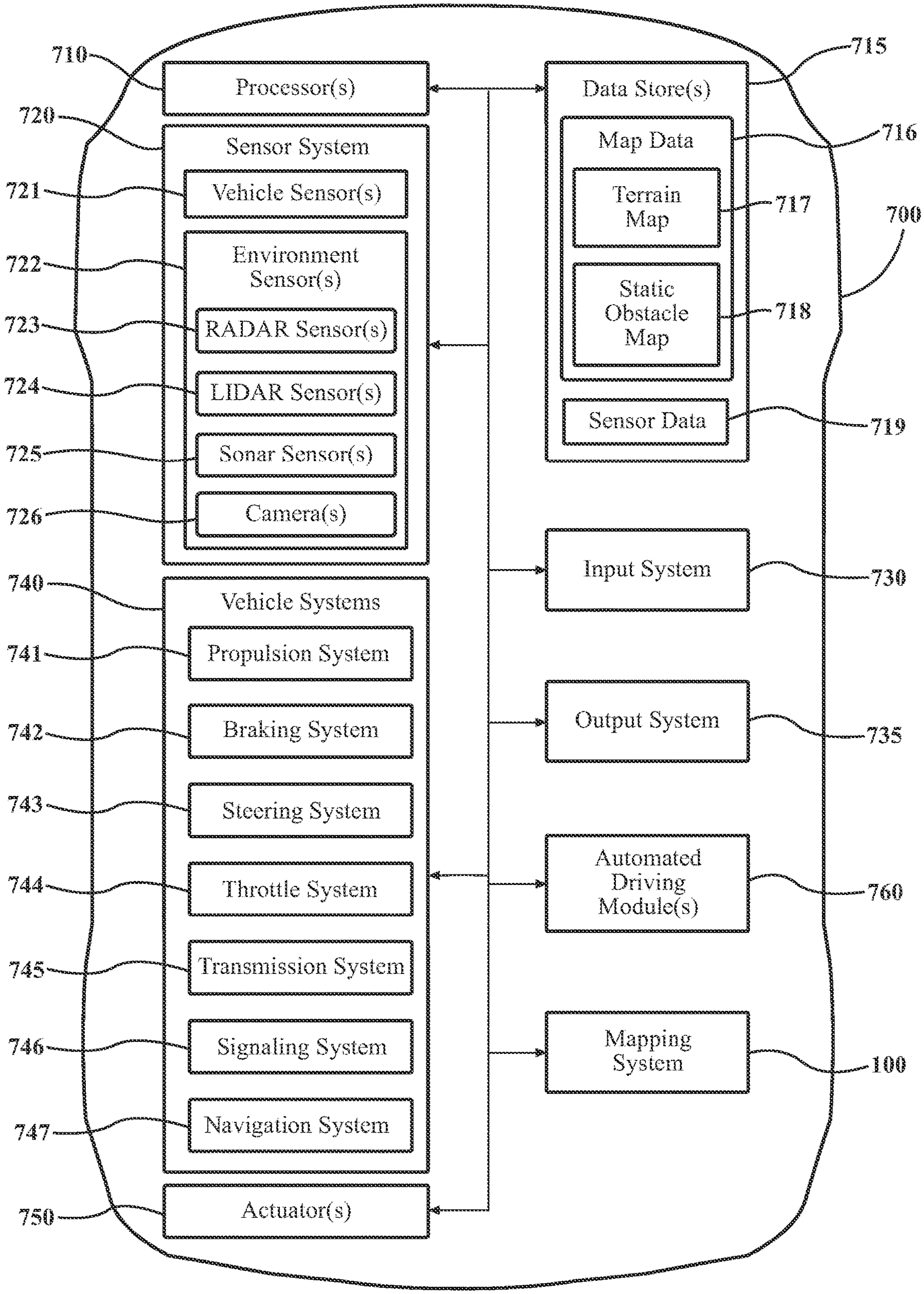
FIG. 7 illustrates one embodiment of a vehicle within which systems and methods disclosed herein may be implemented.

Referring to FIG. 7, an example of a vehicle 700 is illustrated. As used herein, a "vehicle" is any form of transport that may be motorized or otherwise powered. In one or more implementations, the vehicle 700 is an automobile. While arrangements will be described herein with respect to automobiles, it will be understood that embodiments are not limited to automobiles. In some implementations, the vehicle 700 may be a robotic device or a form of transport that, for example, includes sensors to perceive aspects of the surrounding environment, and thus benefits from the functionality discussed herein.

The vehicle 700 also includes various elements. It will be understood that in various embodiments it may not be necessary for the vehicle 700 to have all of the elements shown in FIG. 7. The vehicle 700 can have different combinations of the various elements shown in FIG. 7. Further, the vehicle 700 can have additional elements to those shown in FIG. 7. In some arrangements, the vehicle 700 may be implemented without one or more of the elements shown in FIG. 7. While the various elements are shown as being located within the vehicle 700 in FIG. 7, it will be understood that one or more of these elements can be located external to the vehicle 700. Further, the elements shown may be physically separated by large distances. For example, as discussed, one or more components of the disclosed system can be implemented within a vehicle while further components of the system are implemented within a cloud-computing environment or other system that is remote from the vehicle 700.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 700 includes a mapping system 100 that is implemented to perform methods and other functions as disclosed herein relating to improving mapping through synthesizing probe data.

FIG. 7 will now be discussed in full detail as an example environment within which the system and methods disclosed herein may operate. In some instances, the vehicle 700 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 700 as manipulated by a user (e.g., human driver). In one or more arrangements, the vehicle 700 can be a manually-controlled vehicle that is configured to operate in only the manual mode.

In one or more arrangements, the vehicle 700 implements some level of automation in order to operate autonomously or semi-autonomously. As used herein, automated control of the vehicle 700 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 700 along a travel route via a computing system to control the vehicle 700 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 700.

With continued reference to the various components illustrated in FIG. 7, the vehicle 700 includes one or more processors 710. In one or more arrangements, the processor(s) 710 can be a primary/centralized processor of the vehicle 700 or may be representative of many distributed processing units. For instance, the processor(s) 710 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 700.

The vehicle 700 can include one or more data stores 715 for storing one or more types of data. The data store 715 can be comprised of volatile and/or non-volatile memory. Examples of memory that may form the data store 715 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 715 is a component of the processor(s) 710. In general, the data store 715 is operatively connected to the processor(s) 710 for use thereby. The term "operatively connected," as used throughout this description, can include direct or indirect connections, including connections without direct physical contact.

In one or more arrangements, the one or more data stores 715 include various data elements to support functions of the vehicle 700, such as semi-autonomous and/or autonomous functions. Thus, the data store 715 may store map data 716 and/or sensor data 719. The map data 716 includes, in at least one approach, maps of one or more geographic areas. In some instances, the map data 716 can include information about roads (e.g., lane and/or road maps), traffic control devices, road markings, structures, features, and/or landmarks in the one or more geographic areas. The map data 716 may be characterized, in at least one approach, as a high-definition (HD) map that provides information for autonomous and/or semi-autonomous functions.

In one or more arrangements, the map data 716 can include one or more terrain maps 717. The terrain map(s) 717 can include information about the ground, terrain, roads, surfaces, and/or other features of one or more geographic areas. The terrain map(s) 717 can include elevation data in the one or more geographic areas. In one or more arrangements, the map data 716 includes one or more static obstacle maps 718. The static obstacle map(s) 718 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 719 is data provided from one or more sensors of the sensor system 720. Thus, the sensor data 719 may include observations of a surrounding environment of the vehicle 700 and/or information about the vehicle 700 itself. In some instances, one or more data stores 715 located onboard the vehicle 700 store at least a portion of the map data 716 and/or the sensor data 719. Alternatively, or in addition, at least a portion of the map data 716 and/or the sensor data 719 can be located in one or more data stores 715 that are located remotely from the vehicle 700.

As noted above, the vehicle 700 can include the sensor system 720. The sensor system 720 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 720 and/or the one or more sensors can be operatively connected to the processor(s) 710, the data store(s) 715, and/or another element of the vehicle 700.

Various examples of different types of sensors will be described herein. However, it will be understood that the embodiments are not limited to the particular sensors described. In various configurations, the sensor system 720 includes one or more vehicle sensors 721 and/or one or more environment sensors. The vehicle sensor(s) 721 function to sense information about the vehicle 700 itself. In one or more arrangements, the vehicle sensor(s) 721 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 700.

As noted, the sensor system 720 can include one or more environment sensors 722 that sense a surrounding environment (e.g., external) of the vehicle 700 and/or, in at least one arrangement, an environment of a passenger cabin of the vehicle 700. For example, the one or more environment sensors 722 sense objects the surrounding environment of the vehicle 700. Such obstacles may be stationary objects and/or dynamic objects. Various examples of sensors of the sensor system 720 will be described herein. The example sensors may be part of the one or more environment sensors 722 and/or the one or more vehicle sensors 721. However, it will be understood that the embodiments are not limited to the particular sensors described. As an example, in one or more arrangements, the sensor system 720 includes one or more radar sensors 723, one or more LIDAR sensors 724, one or more sonar sensors 725 (e.g., ultrasonic sensors), and/or one or more cameras 726 (e.g., monocular, stereoscopic, RGB, infrared, etc.).

Continuing with the discussion of elements from FIG. 7, the vehicle 700 can include an input system 730. The input system 730 generally encompasses one or more devices that enable the acquisition of information by a machine from an outside source, such as an operator. The input system 730 can receive an input from a vehicle passenger (e.g., a driver/operator and/or a passenger). Additionally, in at least one configuration, the vehicle 700 includes an output system 735. The output system 735 includes, for example, one or more devices that enable information/data to be provided to external targets (e.g., a person, a vehicle passenger, another vehicle, another electronic device, etc.).

Furthermore, the vehicle 700 includes, in various arrangements, one or more vehicle systems 740. Various examples of the one or more vehicle systems 740 are shown in FIG. 7. However, the vehicle 700 can include a different arrangement of vehicle systems. It should be appreciated that although particular vehicle systems are separately defined, each or any of the systems or portions thereof may be otherwise combined or segregated via hardware and/or software within the vehicle 700. As illustrated, the vehicle 700 includes a propulsion system 741, a braking system 742, a steering system 743, a throttle system 744, a transmission system 745, a signaling system 746, and a navigation system 747.

The navigation system 747 can include one or more devices, applications, and/or combinations thereof to determine the geographic location of the vehicle 700 and/or to determine a travel route for the vehicle 700. The navigation system 747 can include one or more mapping applications to determine a travel route for the vehicle 700 according to, for example, the map data 716. The navigation system 747 may include or at least provide connection to a global positioning system, a local positioning system or a geolocation system.

In one or more configurations, the vehicle systems 740 function cooperatively with other components of the vehicle 700. For example, the processor(s) 710, the mapping system 100, and/or automated driving module(s) 760 can be operatively connected to communicate with the various vehicle systems 740 and/or individual components thereof. For example, the processor(s) 710 and/or the automated driving module(s) 760 can be in communication to send and/or receive information from the various vehicle systems 740 to control the navigation and/or maneuvering of the vehicle 700. The processor(s) 710, the mapping system 100, and/or the automated driving module(s) 760 may control some or all of these vehicle systems 740.

For example, when operating in the autonomous mode, the processor(s) 710, the mapping system 100, and/or the automated driving module(s) 760 control the heading and speed of the vehicle 700. The processor(s) 710, the mapping system 100, and/or the automated driving module(s) 760 cause the vehicle 700 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 700 includes one or more actuators 750 in at least one configuration. The actuators 750 are, for example, elements operable to move and/or control a mechanism, such as one or more of the vehicle systems 740 or components thereof responsive to electronic signals or other inputs from the processor(s) 710 and/or the automated driving module(s) 760. The one or more actuators 750 may include motors, pneumatic actuators, hydraulic pistons, relays, solenoids, piezoelectric actuators, and/or another form of actuator that generates the desired control.

As described previously, the vehicle 700 can include one or more modules, at least some of which are described herein. In at least one arrangement, the modules are implemented as non-transitory computer-readable instructions that, when executed by the processor 710, implement one or more of the various functions described herein. In various arrangements, one or more of the modules are a component of the processor(s) 710, or one or more of the modules are executed on and/or distributed among other processing systems to which the processor(s) 710 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 700 may include one or more automated driving modules 760. The automated driving module(s) 760, in at least one approach, receive data from the sensor system 720 and/or other systems associated with the vehicle 700. In one or more arrangements, the automated driving module(s) 760 use such data to perceive a surrounding environment of the vehicle. The automated driving module(s) 760 determine a position of the vehicle 700 in the surrounding environment and map aspects of the surrounding environment. For example, the automated driving module(s) 760 determines the location of obstacles or other environmental features including traffic signs, trees, shrubs, neighboring vehicles, pedestrians, etc.

The automated driving module(s) 760 either independently or in combination with the mapping system 100 can be configured to determine travel path(s), current autonomous driving maneuvers for the vehicle 700, future autonomous driving maneuvers and/or modifications to current autonomous driving maneuvers based on data acquired by the sensor system 720 and/or another source. In general, the automated driving module(s) 760 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system for synthesizing probe vehicle trace data, comprising:

one or more processors;

a memory communicably coupled to the one or more processors and storing instructions that, when executed by the one or more processors, cause the one or more processors to:

acquire sensor data about a roadway, including at least imaging data of an overhead view of the roadway without ground-truth data;

generate complementary traces of the roadway using a trace model that iteratively generates the complementary traces according to learned perturbations that imitate information acquired from probe vehicles traversing the roadway, including variations between separate traversals, wherein individual traces of the complementary traces include a vehicle trace that defines frames at locations along the roadway, the frames further defining detections about the roadway that are derived perceptions about attributes of the roadway; and provide the complementary traces that include multiple vehicle traces and associated detections about attributes of the roadway, including instructions to generate a map of the roadway from the complementary traces and controlling a vehicle using the map.

2. The mapping system of claim 1, wherein the sensor data includes satellite images of the roadway and, when available, sparse probe data about the roadway, and wherein the instructions to generate the complementary traces include instructions to synthesize the complementary traces by iteratively executing the trace model to encode the sensor data and introduce the learned perturbations so that the complementary traces vary across the roadway as though variations from characteristics of the separate traversals influence the complementary traces.

3. The mapping system of claim 1, wherein the instructions to generate the complementary traces include instructions to iteratively generate the complementary traces one at a time until the complementary traces satisfy a trace threshold, wherein the instructions to generate the complementary traces using the trace model include instructions to consider contextual characteristics when perturbing encoded features as part of decoding the encoded features into the complementary traces, the contextual characteristics include distances to attributes of the roadway, colors of the attributes, and relative positions of the attributes in relation to a frame, and wherein the encoded features are abstract representations of the attributes of the roadway.

4. The mapping system of claim 3, wherein the trace threshold defines a number of complementary traces that are to be generated according to characteristics of the roadway and a defined variation of the complementary traces, the characteristics including at least a number of lanes, and wherein the trace threshold is defined according to a metric that dynamically assesses the complementary traces to determine whether the complementary traces sufficiently cover the roadway to generate the map.

5. The mapping system of claim 1, wherein the instructions include instructions to:

pre-process the sensor data by fusing, when available, sparse probe data captured via a probe vehicle of the roadway with the imaging data.

6. The mapping system of claim 1, wherein the trace model is a generative neural network that synthesizes the complementary traces from the sensor data, and wherein the sensor data further includes information from at least one of a radar and a LiDAR.

7. The mapping system of claim 1, wherein the instructions to generate the complementary traces include instructions to generate the complementary traces as virtual data imitating a path and detections of a vehicle that produces probe data without using real probe data collected by a vehicle.

8. The mapping system of claim 1, wherein the instructions to generate the complementary traces include instructions to complete partial probe data by inferring missing information from sparse probe data.

9. A non-transitory computer-readable medium including instructions that, when executed by one or more processors, cause the one or more processors to:

acquire sensor data about a roadway, including at least imaging data of an overhead view of the roadway without ground-truth data;

generate complementary traces of the roadway using a trace model that iteratively generates the complementary traces according to learned perturbations that imitate information acquired from probe vehicles traversing the roadway, including variations between separate traversals, wherein individual traces of the complementary traces include a vehicle trace that defines frames at locations along the roadway, the frames further defining detections about the roadway that are derived perceptions about attributes of the roadway; and provide the complementary traces that include multiple vehicle traces and associated detections about attributes of the roadway, including instructions to generate a map of the roadway from the complementary traces and controlling a vehicle using the map.

10. The non-transitory computer-readable medium of claim 9, wherein the sensor data includes satellite images of the roadway and, when available, sparse probe data about the roadway, and wherein the instructions to generate the complementary traces include instructions to synthesize the complementary traces by iteratively executing the trace model to encode the sensor data and introduce the learned perturbations so that the complementary traces vary across the roadway as though variations from characteristics of the separate traversals influence the complementary traces.

11. The non-transitory computer-readable medium of claim 9, wherein the instructions to generate the complementary traces include instructions to iteratively generate the complementary traces one at a time until the complementary traces satisfy a trace threshold, wherein the instructions to generate the complementary traces using the trace model include instructions to consider contextual characteristics when perturbing encoded features as part of decoding the encoded features into the complementary traces, the contextual characteristics include distances to attributes of the roadway, colors of the attributes, and relative positions of the attributes in relation to a frame, and wherein the encoded features are abstract representations of the attributes of the roadway.

12. The non-transitory computer-readable medium of claim 11, wherein the trace threshold defines a number of complementary traces that are to be generated according to characteristics of the roadway and a defined variation of the complementary traces, the characteristics including at least a number of lanes.

13. The non-transitory computer-readable medium of claim 9, wherein the instructions include instructions to:

pre-process the sensor data by fusing, when available, sparse probe data captured via a probe vehicle of the roadway with the imaging data.

14. A method, comprising:

acquiring sensor data about a roadway, including at least imaging data of an overhead view of the roadway without ground-truth data;

generating complementary traces of the roadway using a trace model that iteratively generates the complementary traces according to learned perturbations that imitate information acquired from probe vehicles traversing the roadway, including variations between separate traversals, wherein individual traces of the complementary traces include a vehicle trace that defines frames at locations along the roadway, the frames further defining detections about the roadway that are derived perceptions about attributes of the roadway; and providing the complementary traces that include multiple vehicle traces and associated detections about attributes of the roadway, including generating a map of the roadway from the complementary traces and at least semi-autonomously controlling a vehicle using the map.

15. The method of claim 14, wherein the sensor data includes satellite images of the roadway and, when available, sparse probe data about the roadway, and wherein generating the complementary traces includes synthesizing the complementary traces by iteratively executing the trace model to encode the sensor data and introduce the learned perturbations so that the complementary traces vary across the roadway as though variations from characteristics of the separate traversals influence the complementary traces.

16. The method of claim 14, wherein generating the complementary traces includes iteratively generating the complementary traces one at a time until the complementary traces satisfy a trace threshold, wherein generating the complementary traces using the trace model includes considering contextual characteristics when perturbing encoded features as part of decoding the encoded features into the complementary traces, the contextual characteristics include distances to attributes of the roadway, colors of the attributes, and relative positions of the attributes in relation to a frame, and wherein the encoded features are abstract representations of the attributes of the roadway.

17. The method of claim 16, wherein the trace threshold defines a number of complementary traces that are to be generated according to characteristics of the roadway and a defined variation of the complementary traces, the characteristics including at least a number of lanes, and wherein the trace threshold is defined according to a metric that dynamically assesses the complementary traces to determine whether the complementary traces sufficiently cover the roadway to generate the map.

18. The method of claim 14, further comprising:

pre-processing the sensor data by fusing, when available, sparse probe data captured via a probe vehicle of the roadway with the imaging data, wherein respective ones of the complementary traces are comprised of probe data that include frames defining detections and discretized locations of vehicle trace, the detections are of the attributes that include lane boundaries, road boundaries, and road markings.

19. The method of claim 14, wherein the trace model is a generative neural network that synthesizes the complementary traces from the sensor data, and wherein the sensor data further includes information from at least one of a radar and a LiDAR.

20. The method of claim 14, wherein generating the complementary traces includes completing partial probe data by inferring missing from sparse probe data.

* * * * *